(12) United States Patent
Haque

(10) Patent No.: US 12,539,179 B2
(45) Date of Patent: Feb. 3, 2026

(54) SURGICAL NAVIGATION

(71) Applicant: PERSPECTIVE TECHNOLOGIES LLC, Orlando, FL (US)

(72) Inventor: Maahir Haque, Orlando, FL (US)

(73) Assignee: Perspective Technologies LLC, Orlando, FL (US)

( * ) Notice: Subject to any disclaimer, the term of this patent is extended or adjusted under 35 U.S.C. 154(b) by 43 days.

(21) Appl. No.: 18/553,195

(22) PCT Filed: Dec. 19, 2022

(86) PCT No.: PCT/US2022/081935
§ 371 (c)(1),
(2) Date: Sep. 28, 2023

(87) PCT Pub. No.: WO2023/122536
PCT Pub. Date: Jun. 29, 2023

(65) Prior Publication Data
US 2024/0180633 A1 Jun. 6, 2024

Related U.S. Application Data

(60) Provisional application No. 63/291,587, filed on Dec. 20, 2021.

(51) Int. Cl.
*A61B 34/20* (2016.01)
*A61B 90/00* (2016.01)
(Continued)

(52) U.S. Cl.
CPC ............ *A61B 34/20* (2016.02); *G06T 7/0012* (2013.01); *G06T 17/00* (2013.01); *G06T 19/003* (2013.01);
(Continued)

(58) Field of Classification Search
CPC ............ A61B 34/20; A61B 2090/3762; G16H 20/40; G06T 7/0012; G06T 2207/10081;
(Continued)

(56) References Cited

U.S. PATENT DOCUMENTS 7,831,096 B2 11/2010 Williamson
8,280,478 B2 10/2012 Singhal et al.
(Continued)

FOREIGN PATENT DOCUMENTS

EP 3843651 A1 7/2021
WO 2008/112005 A1 9/2008
WO 2017/173333 A2 10/2017

OTHER PUBLICATIONS

"International Search Report and Written Opinion received for PCT Patent Application No. PCT/US2022/081935, mailed on May 17, 2023, 11 pages.", 11 pages.
(Continued)

*Primary Examiner* — Chao Sheng
(74) *Attorney, Agent, or Firm* — Adler Pollock & Sheehan P.C.

(57) ABSTRACT

A method includes receiving preoperative or intraoperative data from an imaging system, receiving interoperatively stereotactic information during a surgical tool tracking from a navigational device, the navigation device configured to identify, confirm, project a location and display the surgical tool within a body, the navigational device further configured to process and interpret volumetric data and the stereotactic information to access a patient's local bone density within and without a current course and directional vector to assist a surgeon to decide on a size and material of an implant to be placed within a patient's bone.

13 Claims, 3 Drawing Sheets

400
Upload computerized tomography (CT) scan in Digital Imaging and Communications in Medicine (DICOM) format of patient
402

Open the CT scan in DICOM format in three planes, , i.e., coronial view, sagittal view and axial view
404

Display a fourth plane, i.e., a generated three dimensional (3D) model
406

Calculate bone density from Hounsfield units (HUs) in the various CT projections and in the 3D model
408

Project the bone density through color coding of the various CT images and of the 3D model
410

Project a screw before placement in any angle, at any place in the bone, as if the screw is placed
412

Display a "virtual" screw as if it is already placed and display the average bone density in the area where the screw would be and circumferentially around screw Update
416

Save the location and trajectory data, place a screw in memory, then proceed towards selection and placement of the next screw
418

(51) Int. Cl.
*G06T 7/00* (2017.01)
*G06T 17/00* (2006.01)
*G06T 19/00* (2011.01)
*G06T 19/20* (2011.01)
*G16H 20/40* (2018.01)

(52) U.S. Cl.
CPC .............. *G06T 19/20* (2013.01); *G16H 20/40* (2018.01); *A61B 2090/3762* (2016.02); *G06T 2200/24* (2013.01); *G06T 2207/10081* (2013.01); *G06T 2207/30008* (2013.01); *G06T 2210/41* (2013.01); *G06T 2219/2004* (2013.01); *G06T 2219/2012* (2013.01)

(58) Field of Classification Search
CPC ........... G06T 2207/30008; G06T 17/00; G06T 19/003; G06T 19/20; G06T 2219/2004; G06T 2219/2012; G06T 2200/24
See application file for complete search history.

(56) References Cited

U.S. PATENT DOCUMENTS

| | | | |
|---|---|---|---|
| 8,886,330 B2 | 11/2014 | Taylor et al. | |
| 10,535,427 B2 | 1/2020 | Goetz | |
| 10,583,310 B1 | 3/2020 | Fram et al. | |
| 10,835,325 B2 | 11/2020 | Isaacs et al. | |
| 10,869,725 B2 | 12/2020 | Chen et al. | |
| 10,932,859 B2 | 3/2021 | Chen et al. | |
| 10,945,795 B2 | 3/2021 | Andersson | |
| 2007/0038223 A1 | 2/2007 | Marquart et al. | |
| 2008/0119724 A1 | 5/2008 | Williamson | |
| 2008/0177203 A1 | 7/2008 | Von | |
| 2016/0324598 A1 | 11/2016 | Bothorel et al. | |
| 2018/0110972 A1 | 4/2018 | Gonzalez-Martinez et al. | |
| 2018/0199998 A1* | 7/2018 | Chen | G06F 3/04815 |
| 2018/0280159 A1* | 10/2018 | Hunter | A61B 17/1703 |
| 2020/0205898 A1* | 7/2020 | Hampp | A61B 34/25 |
| 2021/0282864 A1 | 9/2021 | Gerber et al. | |
| 2021/0322101 A1 | 10/2021 | Varkuti et al. | |

OTHER PUBLICATIONS

Herline, et al., "Image-Guided Surgery Preliminary Feasibility: Studies of Frameless Stereotactic Liver Surgery:", Arch Surg., vol. 134, Jun. 1999, pp. 644-650.

Simon, et al., "Development and Validation of a Navigational Guidance System for Acetabular Implant Placement". CVRMed-MRCAS'97, vol. 1205, 2005, pp. 583-592.

* cited by examiner

400

Upload computerized tomography (CT) scan in Digital Imaging and Communications in Medicine (DICOM) format of patient
402

Open the CT scan in DICOM format in three planes, , i.e., coronial view, sagittal view and axial view
404

Display a fourth plane, i.e., a generated three dimensional (3D) model
406

Calculate bone density from Hounsfield units (HUs) in the various CT projections and in the 3D model
408

Project the bone density through color coding of the various CT images and of the 3D model
410

Project a screw before placement in any angle, at any place in the bone, as if the screw is placed
412

Display a "virtual" screw as if it is already placed and display the average bone density in the area where the screw would be and circumferentially around screw Update
416

Save the location and trajectory data, place a screw in memory, then proceed towards selection and placement of the next screw
418

FIG. 4

SURGICAL NAVIGATION

CROSS REFERENCE TO RELATED APPLICATION

This application is a National Phase fling under 35 U.S.C. § 371 of International Application No. PCT/US2022/081935 filed Dec. 19, 2022, which claims benefit from U.S. Provisional Patent Application No. 63/291,587, filed Dec. 20, 2021, all of which are incorporated by reference in their entirety.

STATEMENT REGARDING GOVERNMENT INTEREST

None.

BACKGROUND OF THE INVENTION

The present invention relates generally to surgery, and more particularly to surgical navigation.

In general, when planning or while performing navigated surgical procedures, it is common to use a cross-sectional imaging modality to create a model in three-dimensional (3D) space, the data of which is then paired with intraoperative surgical device positioning to enable stereotactic navigation. Besides providing spatial information, the data from this cross-sectional imaging may be interpreted and processed in new and novel ways to provide additional justification and utility for the scan.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including receiving preoperative or intraoperative data from an imaging system, receiving interoperatively stereotactic information during a surgical tool tracking from a navigational device, the navigation device configured to identify, confirm, project a location and display the surgical tool within a body, the navigational device further configured to process and interpret volumetric data and the stereotactic information to access a patient's local bone density within and without a current course and directional vector to assist a surgeon decide on a size and material of an implant to be placed within a patient's bone.

In another aspect, the invention features a method including receiving preoperative or intraoperative data from an imaging system, receiving stereotactic information from an interoperative tool collected by a navigation device, the navigation device configured to identify and confirm a location of the interoperative tool within a body, and process and interpret volumetric data to access a patient's bone density, and displaying the local bone density.

In still another aspect, the invention features method including uploading computerized tomography (CT) scan in Digital Imaging and Communications in Medicine (DICOM) format of a patient, opening the CT scan in DICOM format in three planes, displaying a fourth plane, and calculating a bone density from Hounsfield units (HUs) in the various CT projections and in a three dimensional (3D) model.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 4 is a flow diagram.

DETAILED DESCRIPTION

Figure 1:
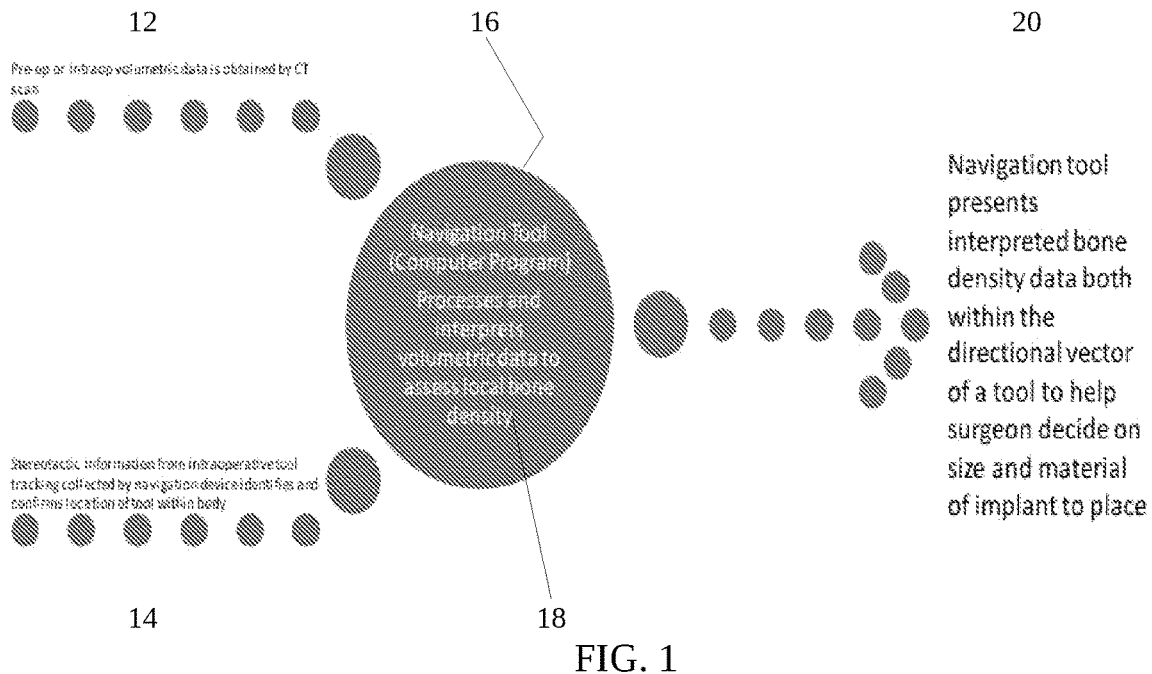
FIG. 1 shows a schematic illustration of a navigation tool and related method according to a first embodiment of the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 2:
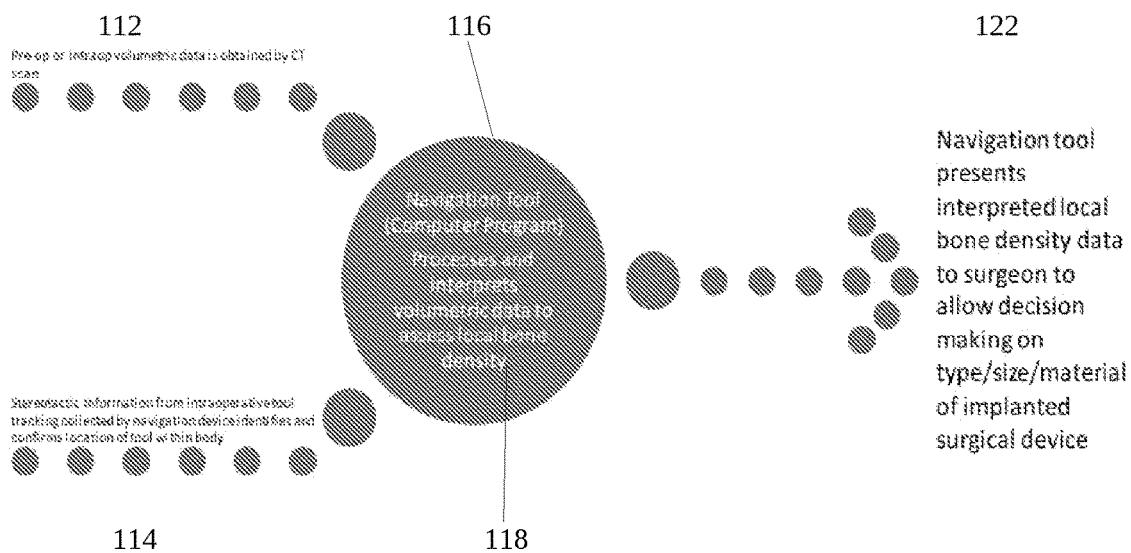
FIG. 2 shows a schematic illustration of a navigation tool and related method according to a second embodiment of the present invention.
Figure 3:
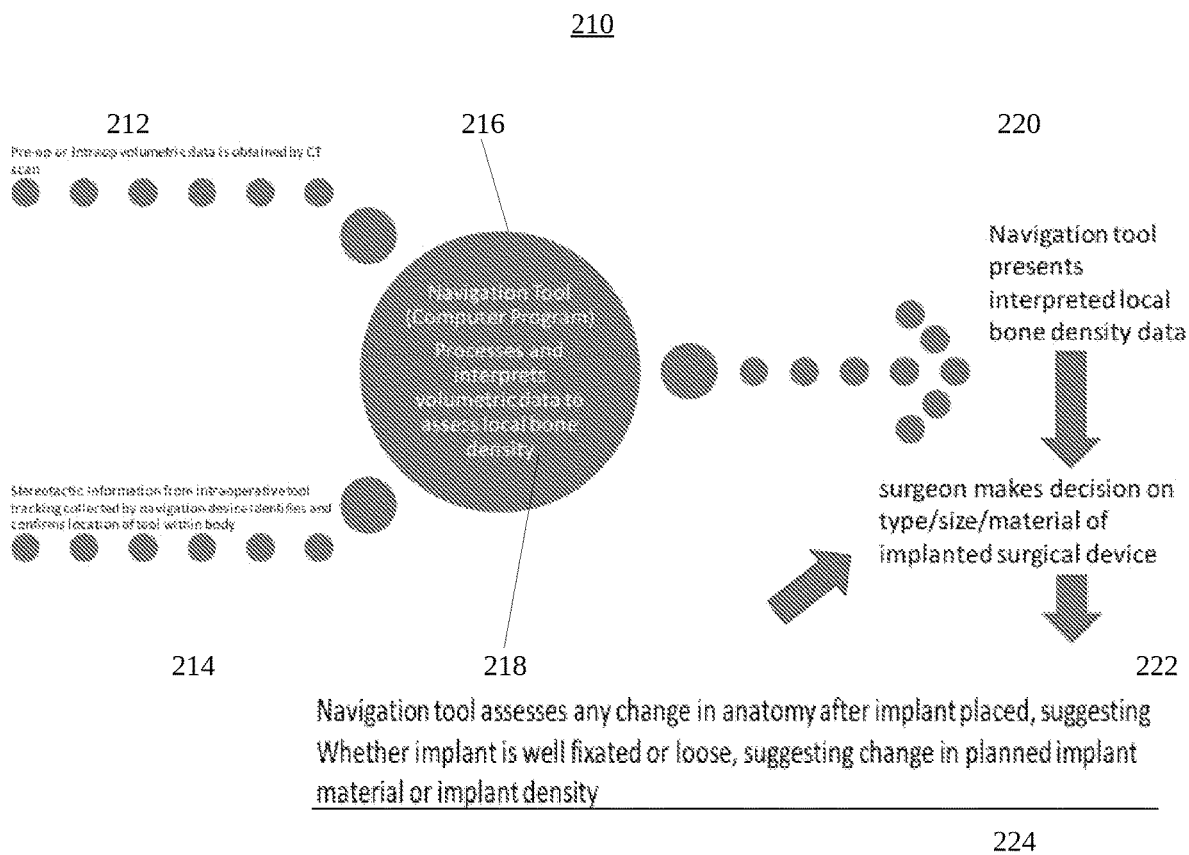
FIG. 3 shows a schematic illustration of a navigation tool and related method according to a third embodiment of the present invention.

Disclosed herein are surgical tools, systems and methods to process the three-dimensional (3D) data and project that data in a specific way that can help surgeons make decisions prior to and during surgery that involves implant placement in bone, as shown schematically in FIGS. 1-3. As will be appreciated by those of ordinary skill in this art, the systems and methods described herein may be used in spine and other joint replacements.

The surgical tool pairs preoperative cross-sectional imaging data with stereotactic information intraoperatively to help make surgical decisions on implant density, implant location, and implant material. This information can be helpful during surgeries which involve placement of multiple implants into bone.

The surgical tools, systems and methods disclosed herein provide additional utility for preoperative and intra-operative cross-sectional imaging studies that are routinely performed for surgical planning.

The surgical tools, systems and methods disclosed herein also allow surgeons to better understand where to place implants, how many implants to place, and what implant material may be most useful for the individual patient.

The surgical tools, systems and methods disclosed herein also have the ability to suggest when it will be a good idea to augment osseous structures during/after implant placement. In patients with poor bone density or in whom the number of fixation points is insufficient, screw augmentation with cement can be performed to decrease the risk of construct failure due to screw pull-out.

The surgical tools, systems and methods disclosed herein also allow closer control of patient/surgical variables to optimize patient outcomes. By more specifically suggesting and later considering implant location, implant density, and implant type (and after implantation, reconsidering the same variables), the system can reference proprietary data and present that data to the surgeon to easier facilitate potential corrective intraoperative decision making.

No other surgical tools or systems in the prior art have considered using this pre- and intraoperative cross-sectional data for this purpose.

No other surgical tools or systems in the prior art have considered using this preoperative and intraoperative cross-sectional data for this purpose.

The surgical tools, systems and methods disclosed herein benefit the surgeon by offering better peace of mind and helping the surgeon to choose among different implant types and materials. Navigation systems currently on the market do not currently provide such active assistance in preoperative and intraoperative surgical decision making.

An embodiment of the surgical tool and system 10 and method of the present invention is illustrated in FIG. 1. Preoperative or intraoperative volumetric data is obtained 12, e.g., by CT scan or other imaging techniques. If the scan is done preoperatively, the data can be referenced and processed to aid in surgical decision making. Intraoperatively, stereotactic information obtained during tool tracking is collected by the navigation device which identifies, confirms, and projects 14 the location of the tool within the body onto a display that the surgeon can reference. The navigation tool 16 involves a computer program in various embodiments. This computer program runs on a proprietary device during surgery. The navigation tool 16 processes and interprets 18 the volumetric data and the stereotactic information to assess a patient's local bone density.

Methods are known to exist for calculating bone density from CT scans. This is currently done for patients in lieu of or in addition to a DEXA scan. Existing technologies and applications for this CT-based bone density calculation intend to present an idea of whole-body bone density, whereas this specific technique proposed can present bone density information in a single part of a single bone or in a segment/region of the skeleton.

The navigation tool 16 then presents in real-time 20 the interpreted bone density data within and without the current course and directional vector of a navigable surgical tool to help the surgeon decide on the size and material of the implant to be placed within the patient's bone. For instance, such a technique would be useful to allow surgeons to decide on the cross-sectional size or the longitudinal length of a screw or implant, when multiple size choices exist. The technique might also be used to help a surgeon determine whether or not it is necessary to place instrumentation/implants at contiguous levels (and what levels those might be).

Another embodiment of the surgical tool and system 110 and method of the present invention is illustrated in FIG. 2 and is similar to that shown in FIG. 1. Pre-operative or intraoperative data is obtained 112, e.g., by CT scan or other imaging techniques. Stereotactic information from intraoperative tool tracking collected by the navigation device identifies and confirms 114 the location of the tool within the body. The navigation tool 116 is a computer program in various embodiments. The navigation tool 116 processes and interprets 118 the volumetric data to assess a patient's local bone density. The navigation tool 116 then presents 122 the interpreted local bone local density data to the surgeon to allow him or her to decide on the type, size and material of the implant to be placed within the patient's bone.

Yet another embodiment of the surgical tool and system 210 and method of the present invention is illustrated in FIG. 3 and is similar to that shown in FIGS. 1 and 2. Pre-operative or intraoperative data is obtained 212, e.g., by CT scan or other imaging techniques. Stereotactic information from intraoperative tool tracking collected by the navigation device identifies and confirms 214 the location of the tool within the body. The navigation tool 216 is a computer program in various embodiments. The navigation tool 216 processes and interprets 218 the volumetric data to assess a patient's local bone density. The navigation tool 216 then presents 220 the interpreted local bone local density data to the surgeon. The surgeon then decides 222 on the type, size and material of the implant to be placed within the patient's bone. The navigation tool 216 then assesses 224 any change in the patient's anatomy by re-evaluating the intraoperative anatomy after the implant has been placed within the patient's bone, suggesting whether the implant is well-fixated or loose, and suggesting any changes in the planned implant material and/or implant density. If the placed screw has loosened or pulled out and lacks necessary stability or if an interbody device placed settles into the bone rather than expanding the cavity in which it is placed, thereby not facilitating the intended anatomical realignment, the system can alert the surgeon so that he may alter his/her surgical plan.

Non-limiting examples of implants that may be used with the tools, systems and methods of the present invention include pedicle screws, iliac fixation screws, lateral mass screws, cross link hardware, spinous process fixation hardware, interbody devices and bone fixation screws.

Regarding implant density, the Program of the present invention may allow decision making before and during surgery as to how many implants should be placed into an individual bone (for instance unilateral vs bilateral screw fixation), as to which trajectory to employ (pedicle vs translaminar vs facet screw vs lateral mass screw), or as to how many intermixing implants (like rods used for mating screws together) should be employed to minimize the risk of loss of fixation.

Implants used with the tools, systems and methods of the present invention are made from various materials, with some implants stronger than bone and others of similar density to bone. In the case of the Program of the present invention, the Program may suggest the use of less-strong implants (like titanium or cannulated implants) to avoid screw cut-out from bone or stronger implant materials (like stainless steel) to minimize the risk of implant fracture.

Referring now to FIG. 4, a navigational process 400 includes uploading (402) computerized tomography (CT) scan in Digital Imaging and Communications in Medicine (DICOM) format of patient. DICOM is a standard protocol for the management and transmission of medical images and related data.

Navigational process 400 opens (404) the CT scan in DICOM format in three planes, i.e., coronial view, sagittal view and axial view. Successive CT scan slices can be scrolled through in all three planes. These CT scan slices can be zoomed in and out, and can be moved from one end to the other as well, based on different navigation.

Navigational process 400 displays (406) a fourth plane, i.e., a generated three dimensional (3D) model. This 3D model can be sectioned in oblique planes of choice. The 3D model can be zoomed in and out and rotated in 3D space.

Navigational process 400 calculates (408) bone density from Hounsfield units (HUs) in the various CT projections and in the 3D model. It can do so in any arbitrary direction chosen in 3D space.

Navigational process 400 projects (410) the bone density through color coding of the various CT images and of the 3D model, to show the bone density pixel wise—the color coding is in a spectrum of pink to yellow to green, depicting poor to average to excellent bone density. In the 3D model, the bone density is displayed segment wise, to give a better representation of the plane of a surgeon's tool in 3D space, so that the surgeon can plan their screw placement and procedure according to the bone density in the vector of his/her tool.

Navigational process 400 enables the surgeon to choose different-sized screws or implants which can be superimposed upon the CT scan and 3D model for planning.

Pairing the navigational process 400 with standard stereotactic navigation functionality during surgery, the navigational process 400 can project (412) a screw before placement in any angle, at any place in the bone, as if the screw is placed. As the tool moves, the other views adjust in real-time to show the bony anatomy in the line of the tool.

The navigational process 400 displays (414) a "virtual" screw as if it is already placed and display the average bone density in the area where the screw would be and circumferentially around screw. The navigational process 400 can also display the angle of the proposed screw (using stereotactic information) medially-laterally and cephalad-caudad. In the case that a virtual screw would exit bone and hit adjacent soft tissue, the area of that virtual screw which exits the bone is displaced as RED.

As an intraop and preop planning during or prior to surgery, the surgeon or an assistant can "plan" and save plans for virtual screws, saving the trajectories and sizes for future reference. The user can place multiple screws. By using a mouse or other input device to tap on and dragging a pre-planned screw, the surgeon can move it around within a bone or between different bones in the 3D model. In this case, a depiction of 3D view movement is displayed as a 3-arrow representation of the trajectory in 3D space. As soon as the button is released, this 3-arrow depiction gets hidden from view and a screw is displaced in the new location/ trajectory. The surgeon can then analyze the trajectory of the screw in the other views. In real-time, the navigational process 400 displays the movement of a virtual screw in of all the views. In case the screw is moved to a different segment or area of the bone, the other three sections move to the new section as well. The navigational process 400 can be controlled by a surgeon using, for instance, a foot pedal or hand tool.

During movement of the virtual screw either by stereotactic navigation or through a planning module, the angles and bone density of areas traversed by the screw are updated (416) accordingly—these are updated as the screw is being moved also, to represent how the screw is being changed. If bone density is low, referencing proprietary information, the navigational process 400 can recommend changes in trajectory or perhaps screw augmentation with cement.

Once the screw positioning is finalized, the surgeon can then save (418) the location and trajectory data, place a screw in memory, then proceed towards selection and placement of the next screw. As subsequent screws are placed, their "place" in 3D space and in the body is saved and projected onto the CT slices and into the 3D model generated by the navigational process 400. In the case that the screws are connected with rods or other implants, the navigational process 400 can project how the overall construct will appear, to ensure interconnection is possible without disrupting other adjacent structures. The navigational process 400 can also calculate (and display) the total amount of screw purchase in bone by adding the density of the regions with screws, biomechanically calculating the forces across the construct during different physical activities, and referencing proprietary artificial intelligence and machine learning databases to suggest potentially adding additional fixation.

The surgeon can also delete any virtual screw at any given time by interaction with the navigational process 400 through, for instance, a pedal. This will remove the screw from the view, and will update all referencing as per the remaining screws. There is also an option to Undo and Redo, which will keep a track of all actions being performed, and can revert or redo any step, as per the sequence of activity being reverted or redone.

Once all the virtual or final implants are placed, the information can be saved by the surgeon—this will add a layer on top of the DICOM slices, which will contain the information of each screw, in its 3D position and trajectory, as well as the referencing information to manage the interconnectivity between screws.

The navigational process 400 can be used to resume work by reopening the DICOM file again, which will open the most recent saved view, so that the tasks can be resumed from the same point onwards.

In general, any combination of disclosed features, components and methods described herein is possible. Steps of a method can be performed in any order that is physically possible.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method performed by a computer-based surgical navigation system comprising at least a processor, a memory, a display, an input device, and a stereotactic tracking interface, the method comprising:
   (a) retrieving, before a surgery, preoperative data comprising computed-tomography data that provide Hounsfield-unit values; acquiring, during the surgery, intraoperative data; and pairing the intraoperative data to the preoperative data;
   (b) opening the preoperative computed-tomography data in three orthogonal planes and generating a three-dimensional model of a subject's anatomy who is undergoing the surgery;
   (c) defining a candidate trajectory of a virtual implant and computing, from the Hounsfield-unit values, voxel-wise bone-density values and a purchase score for the candidate trajectory by aggregating bone-density values of voxels within a circumferential shell surrounding the virtual implant along the candidate trajectory, and continuously recalculating the purchase score in real time in response to changes in the paired intraoperative data and in a pose of a tool being stereotactically tracked;
   (d) presenting, in real time using the paired intraoperative data, within and without a current course and directional vector of the stereotactically tracked tool, a local-density profile and the purchase score while projecting the virtual implant on the display, and visually indicating in red any portion of the virtual implant that would exit bone;

(e) automatically generating, based on the purchase score and stored patient-specific information, an intraoperative recommendation comprising at least one of: implant trajectory, implant size, implant material, cement augmentation, or additional fixation;

(f) determining whether the purchase score satisfies a reference threshold to classify purchase as sufficient or insufficient and, responsive to the classification, generating the intraoperative recommendation including, for insufficient purchase, at least one of: modifying the implant trajectory, augmenting with cement, or adding fixation; and (g) after placement of at least one implant, re-evaluating the anatomy using the paired intraoperative data and the stereotactically tracked tool to classify the placed implant as well-fixated or loose according to defined criteria and, in response, updating the intraoperative recommendation.

2. The method of claim 1, wherein the intraoperative data comprise computed-tomography (CT) data providing the Hounsfield-unit values.

3. A computer-based surgical navigation system comprising at least a processor, a memory, a display, an input device, and a stereotactic tracking interface, the system configured to:

(a) retrieve, before a surgery, preoperative computed-tomography data and, during the surgery, acquire intraoperative computed-tomography data;

pair the intraoperative data to the preoperative data; and open the preoperative data in three orthogonal planes while generating a three-dimensional model of an anatomy of a subject undergoing the surgery;

(b) compute, from Hounsfield unit values of the preoperative data, voxel-wise bone-density values and, for a candidate trajectory of a virtual implant, determine (i) a local-density profile along the candidate trajectory and (ii) a purchase score obtained by aggregating bone-density values of voxels within a circumferential shell around the virtual implant, and continuously recalculate the purchase score in real time in response to changes in the paired intraoperative data and in a pose of a tool being stereotactically tracked;

(c) present, in real time using the paired intraoperative data, within and without a current course and directional vector of the stereotactically tracked tool, the local-density profile and the purchase score, and project the virtual implant, wherein any portion of the virtual implant that would exit bone is indicated in red;

(d) automatically generate intraoperative recommendations including at least one of: implant trajectory, implant size, implant material, cement augmentation, or additional fixation, based on the purchase score and stored patient-specific information;

(e) after placement of at least one implant, re-evaluate the anatomy using the paired intraoperative data to classify the placed implant as well-fixated or loose according to defined criteria and, responsive thereto, update the intraoperative recommendations; and (f) when a construct includes plural implants, calculate and display a construct-level purchase value by aggregating bone-density values of regions that contain the plural implants and biomechanically estimating forces across the construct during different physical activities, and, by referencing stored artificial-intelligence or machine-learning databases, suggest potentially adding additional fixation.

4. The system of claim 3 wherein the system is configured to compare the purchase score to a reference threshold to classify purchase as sufficient or insufficient.

5. The system of claim 3, wherein the display is configured to present the bone-density value by color-coding the preoperative and intraoperative computed-tomography data and the three-dimensional model on a per-voxel basis.

6. The system of claim 5, configured during surgery to pair with stereotactic navigation and, before placement, to project the virtual implant at any angle and location within bone.

7. The system of claim 6, wherein the display is configured to show the virtual implant as if already placed and is configured to show an average bone density in a region corresponding to the virtual implant and circumferentially around the virtual implant.

8. The system of claim 7, wherein the display is configured to show an angle of the virtual implant relative to mediolateral and craniocaudal axes using stereotactic tracking information.

9. The system of claim 8, configured to update in real time the displayed angle of the virtual implant and the bone-density values for voxels along a path traversed by the virtual implant.

10. The system of claim 9, wherein the purchase score is displayed as a numeric value and as a curve plotted along the candidate trajectory.

11. The system of claim 3, wherein, when purchase is classified as insufficient, the system is configured to an intraoperative recommendation comprising at least one of: modifying the implant trajectory, augmenting with cement, or adding fixation.

12. The system of claim 11, wherein the intraoperative recommendation is based on stored patient specific information.

13. The system of claim 12, configured, after placement of at least one implant, to reevaluate the anatomy using the paired intraoperative data, to classify the placed implant as well fixated or loose according to defined criteria, and to update the intraoperative recommendation accordingly.

* * * * *